US012767110B2

(12) United States Patent
Strieter et al.

(10) Patent No.: US 12,767,110 B2
(45) Date of Patent: Oct. 20, 2026

(54) ELECTROMECHANICAL ACTUATOR PACKAGE WITH INTEGRATED ELECTRICAL CONTROL UNIT (ECU)

(71) Applicant: HL MANDO CORPORATION, Gyeonggi-do (KR)

(72) Inventors: Troy Strieter, Auburn, MI (US); Joshua Grove, Auburn, MI (US); Jeff Lauman, Auburn, MI (US)

(73) Assignee: HL MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 19/223,557

(22) Filed: May 30, 2025

(65) Prior Publication Data

US 2026/0008446 A1 Jan. 8, 2026

Related U.S. Application Data

(60) Provisional application No. 63/668,125, filed on Jul. 5, 2024.

(51) Int. Cl.

| | |
|---|---|
| ***B60T 13/74*** | (2006.01) |
| ***H02K 5/22*** | (2006.01) |
| ***H02K 11/215*** | (2016.01) |
| ***H02K 11/33*** | (2016.01) |

(52) U.S. Cl.

CPC .......... *B60T 13/741* (2013.01); *B60T 13/746* (2013.01); *H02K 5/22* (2013.01); *H02K 11/215* (2016.01); *H02K 11/33* (2016.01); *B60T 2260/02* (2013.01); *H02K 2211/03* (2013.01)

(58) Field of Classification Search

CPC .. B60T 13/741; B60T 13/746; B60T 2260/02; H02K 5/22; H02K 11/215; H02K 11/33; H02K 2211/03; F16D 65/005; F16D 65/18; F16D 2121/24; F16H 7/02

See application file for complete search history.

(56) References Cited

U.S. PATENT DOCUMENTS

2017/0341681 A1* 11/2017 Shiino .................... B62D 5/046

* cited by examiner

*Primary Examiner* — Xiao En Mo

(74) *Attorney, Agent, or Firm* — WOMBLE BOND DICKINSON (US) LLP

(57) ABSTRACT

An electromechanical actuator package for actuating a brake assembly is provided. The electromechanical actuator package may include: a motor having a motor body and a motor rotation shaft protruding from the motor body; a drive mechanism connecting the motor rotation shaft to an actuator output via a drive component; a circuit board; and a housing enclosing the motor, the drive mechanism, and the circuit board, wherein the circuit board is positioned between the drive component and the motor body.

20 Claims, 7 Drawing Sheets

ELECTROMECHANICAL ACTUATOR PACKAGE WITH INTEGRATED ELECTRICAL CONTROL UNIT (ECU)

CROSS REFERENCE TO PARENT APPLICATIONS

This application claims the benefit of U.S. Patent Application Ser. No. 63/668,125 filed on Jul. 5, 2024, entitled "MECHANICAL INTEGRATION OF ECU PCB TO EMB HOUSING", the entirety of which is incorporated herein by reference.

TECHNICAL FIELD

Some embodiments of the present disclosure relate to electrically actuated brake systems and, in particular, to an electromechanical actuator package that drives a brake assembly, for example, but not limited to, a brake caliper.

BACKGROUND

A brake system for a motor vehicle, and in particular an automotive vehicle, functionally reduces the speed of the vehicle or maintains the vehicle in a rest position. Various types of brake systems are commonly used in automotive vehicles, including hydraulic, anti-lock or "ABS," and electric or "brake by wire." For example, in a hydraulic brake system, the hydraulic fluid transfers energy from a brake pedal to a brake pad for slowing down or stopping rotation of a wheel of the vehicle. Electronics control the hydraulic fluid in the hydraulic brake system. In the electric brake system, the application and release of the brake is controlled by an electric caliper via electrical signal.

These electric brake systems typically include an electromechanical actuator connected to a brake caliper either by a cable, as the drum in head, or directly attached to the brake caliper. The actuator converts electrical power to rotational mechanical output power for moving the cable or drive screw and applying the brakes. Generally, the electro-mechanical actuator includes a motor and a gear or belt system.

It would be desirable to have an apparatus and method that take into account some of the issues discussed above, as well as other possible issues.

SUMMARY

The features and advantages of the present disclosure will be more readily understood and apparent from the following detailed description, which should be read in conjunction with the accompanying drawings, and from the claims which are appended to the end of the detailed description.

According to various embodiments of the present disclosure, an electromechanical actuator package for actuating a brake assembly may comprise: a motor comprising a motor body and a motor rotation shaft protruding from the motor body; a belt drive mechanism connecting the motor rotation shaft to an actuator output via a drive belt; a circuit board; and a housing enclosing the motor, the belt drive mechanism, and the circuit board, wherein the circuit board is positioned between the drive belt and the motor body.

The housing comprises a housing body and a cover, and a top side of the circuit board faces the drive belt and the cover.

The drive belt is positioned between the cover and the circuit board.

The circuit board is installed on the housing body.

The housing body comprises a tubular housing portion in which the motor is positioned and a planar housing portion in which the circuit board is positioned, and the cover being attached onto the planar housing portion of the housing body.

The housing body is attached to a brake caliper.

Within the housing, the circuit board is positioned closer to the motor body than the drive belt.

The cover is a Snap-On cover.

A portion of the motor rotation shaft extends past a first surface of the circuit board, and the first surface of the circuit board faces the drive belt while a second surface of the circuit board faces the motor body from which the motor rotation shaft protrudes.

The portion of the motor rotation shaft extends past the first surface of the circuit board through an opening formed on a body of the circuit board.

The circuit board comprises a motor position sensor configured to sense an angular position of the motor rotation shaft in an off-axis configuration manner.

Magnetically charged elements are attached to an outer circumference of the motor rotation shaft at a position where the motor rotation shaft extends through the opening formed on the body of the circuit board.

The magnetically charged elements are held within a belt flange that is attached to the outer circumference of the motor rotation shaft.

The drive belt comprises a first surface and a second surface, the first surface being wider than the second surface and engages with the motor rotation shaft, and the circuit board faces the second surface of the drive belt.

The first surface of the drive belt surrounds a portion of the motor rotation shaft.

The drive belt is attached to a first portion of the motor rotation shaft, the circuit board is positioned adjacent to a second portion of the motor rotation shaft, and the first portion of the motor rotation shaft is closer to a distal end of the motor rotation shaft than the second portion of the motor rotation shaft.

The second portion of the motor rotation shaft is closer to a body of the motor from which the motor rotation shaft extends.

The housing comprises a housing body and a cover, the motor rotation shaft extends toward the cover, and a first side of the circuit board faces the cover and the drive belt while a second side of the circuit board faces the body of the motor.

According to various embodiments of the present disclosure, an electromechanical actuator package for actuating a brake assembly may comprise: a motor comprising a motor body and a motor rotation shaft protruding from the motor body; a gear drive mechanism connecting the motor rotation shaft to an actuator output via one or more gears; a circuit board; and a housing enclosing the motor, the gear drive mechanism, and the circuit board, wherein the circuit board is positioned between the one or more gears and the motor body.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Various embodiments in accordance with the present disclosure will be described with reference to the drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

In the following detailed description, reference is made to the accompanying drawings which form a part hereof, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

Figure 1A:
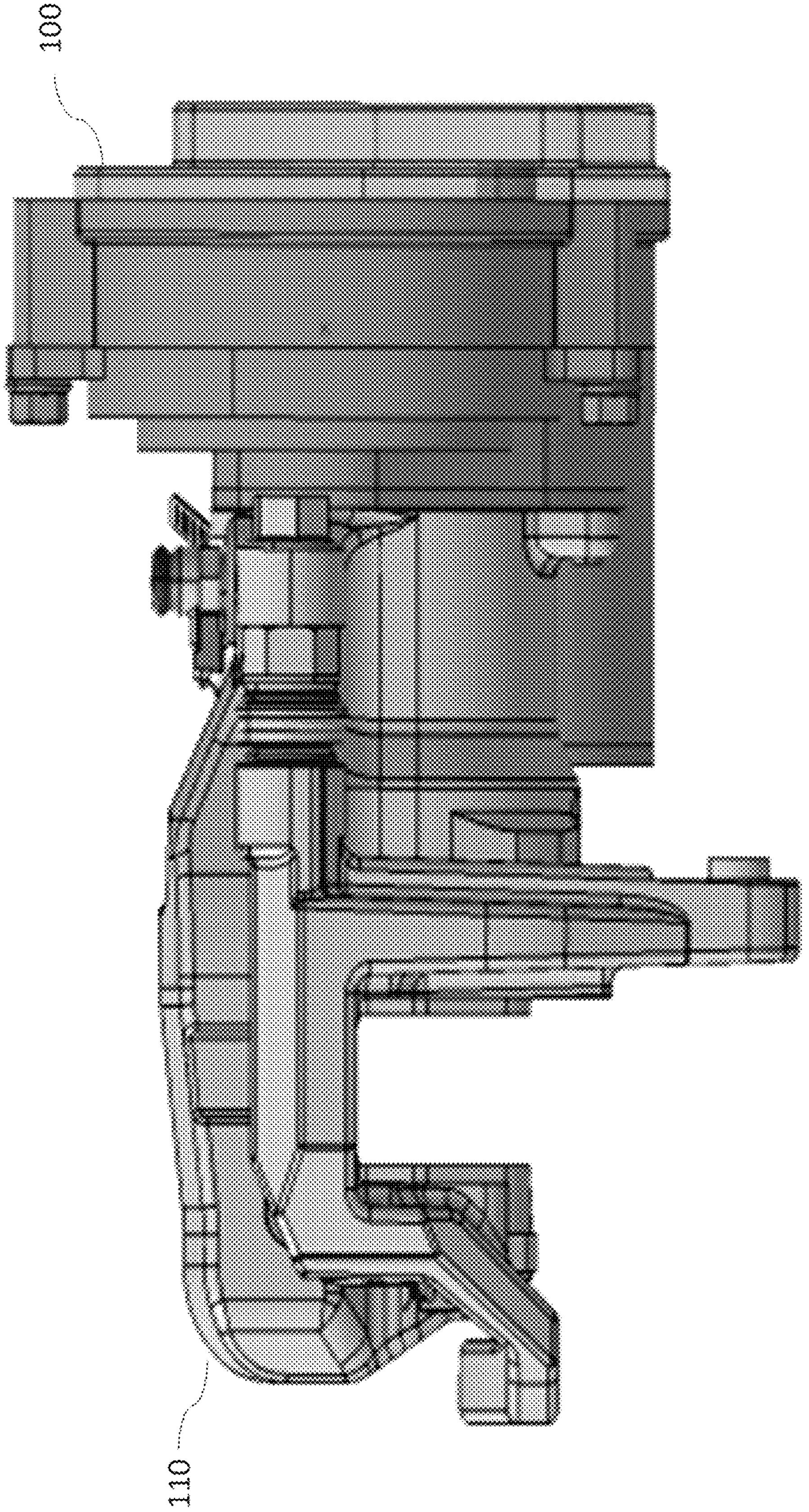
FIG. 1A shows a side view of an electromechanical actuator package coupled to a brake assembly according to exemplary embodiments of the present disclosure.
Figure 1B:
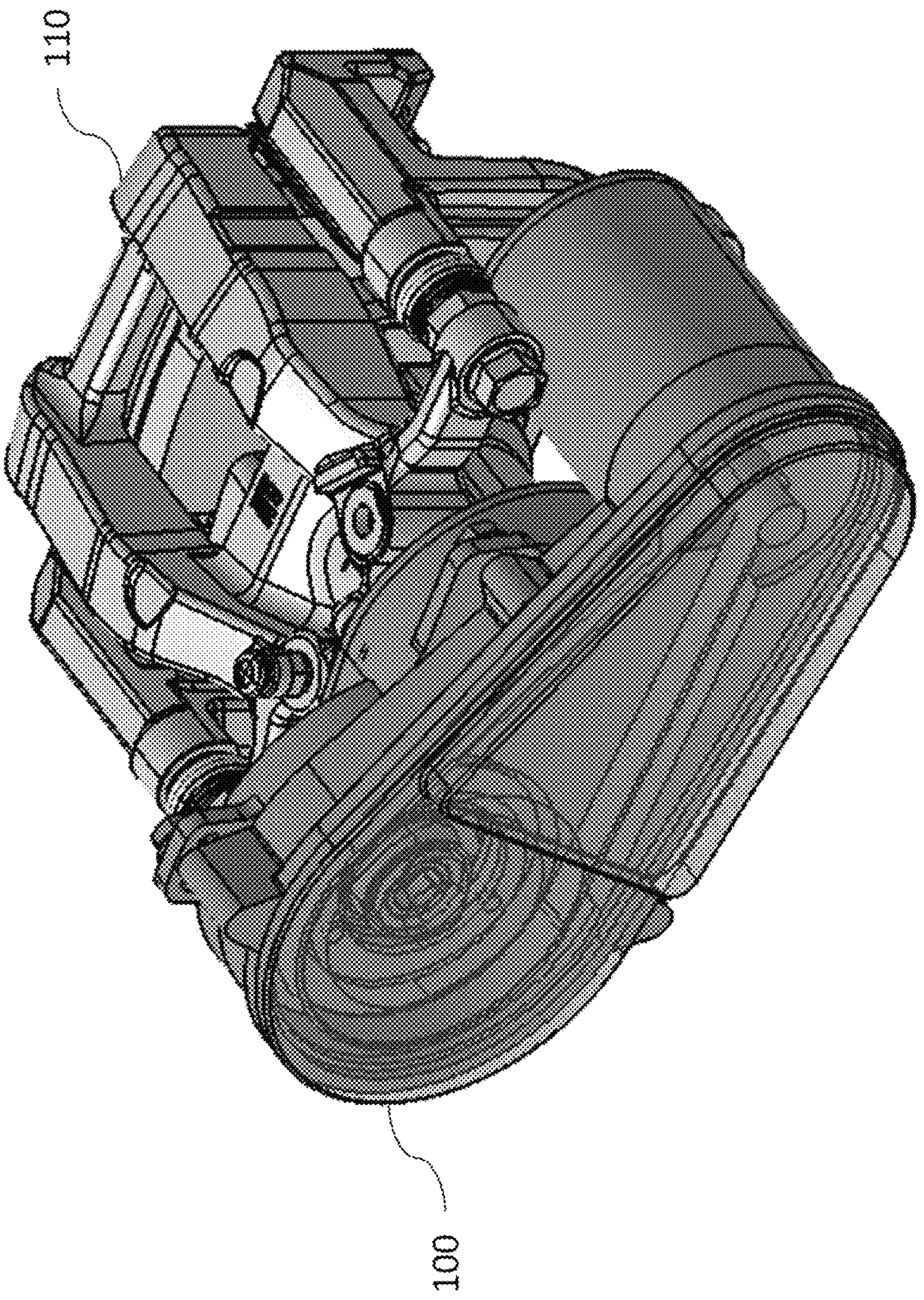
FIG. 1B shows a top perspective view of an electromechanical actuator package coupled to a brake assembly according to exemplary embodiments of the present disclosure.

FIGS. 1A and 1B illustrate an exemplary embodiment where an electromechanical actuator package 100 is coupled to a brake assembly. As shown in FIG. 1A, an electromechanical actuator package 100 may be directly mounted or indirectly connected to a brake assembly, for example, but not limited to, a brake caliper 110. The electromechanical actuator package 100 may be configured to actuate or drive the brake caliper 110. The electromechanical actuator package 100 can supply braking force to the brake caliper 110 via an actuator output opening (e.g., 258 of FIG. 2A) that houses an actuator output of the electromechanical actuator package 100. The electromechanical actuator package 100 may be coupled to the brake caliper 110 for applying the brakes using a variety of ways. For example, a ball screw mechanism of the brake caliper 110 (not shown) may be inserted into the actuator output opening of the electromechanical actuator package 100 and be attached to the actuator output to generate axial force for actuating a brake (e.g., via the ball screw mechanism being actuated by the actuator output). The electromechanical actuator package 100 may be mounted to any suitable portion of a vehicle, including frame, body, and trim components.

Figure 2A:
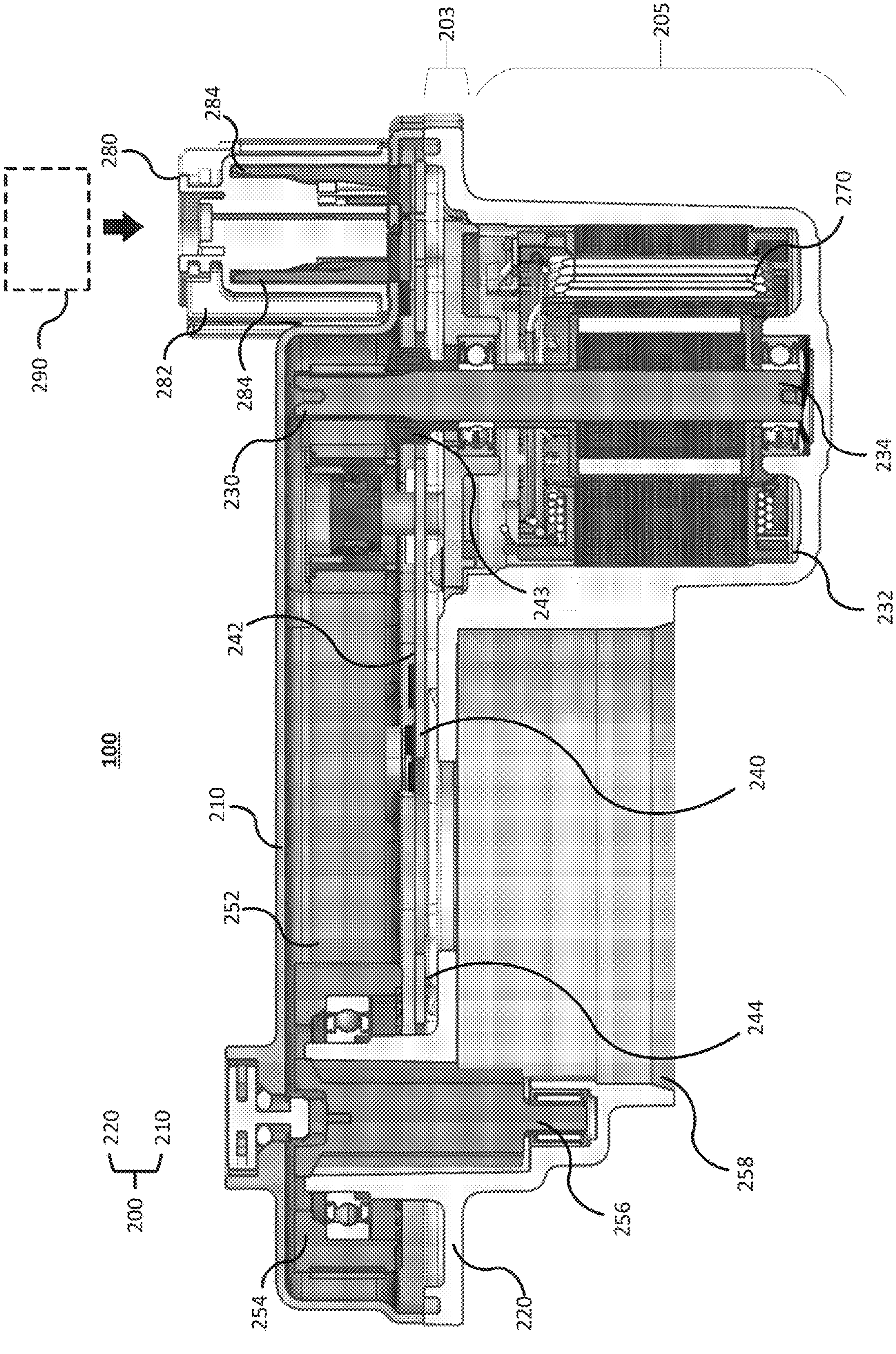
FIG. 2A shows a cross-sectional view of the electromechanical actuator package according to exemplary embodiments of the present disclosure.
Figure 2B:
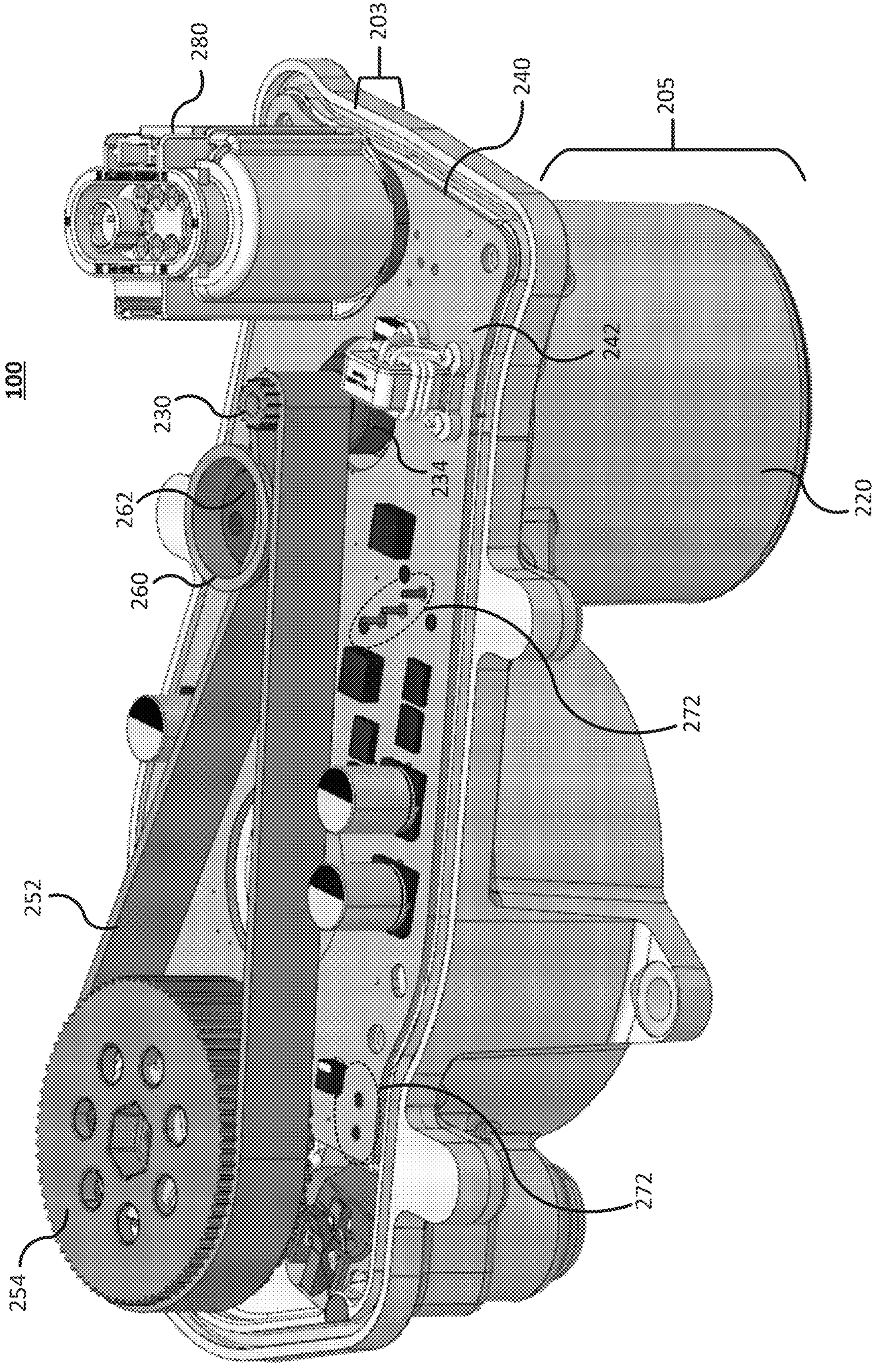
FIG. 2B shows a perspective view of the electromechanical actuator package with a cover removed according to exemplary embodiments of the present disclosure.
Figure 2C:
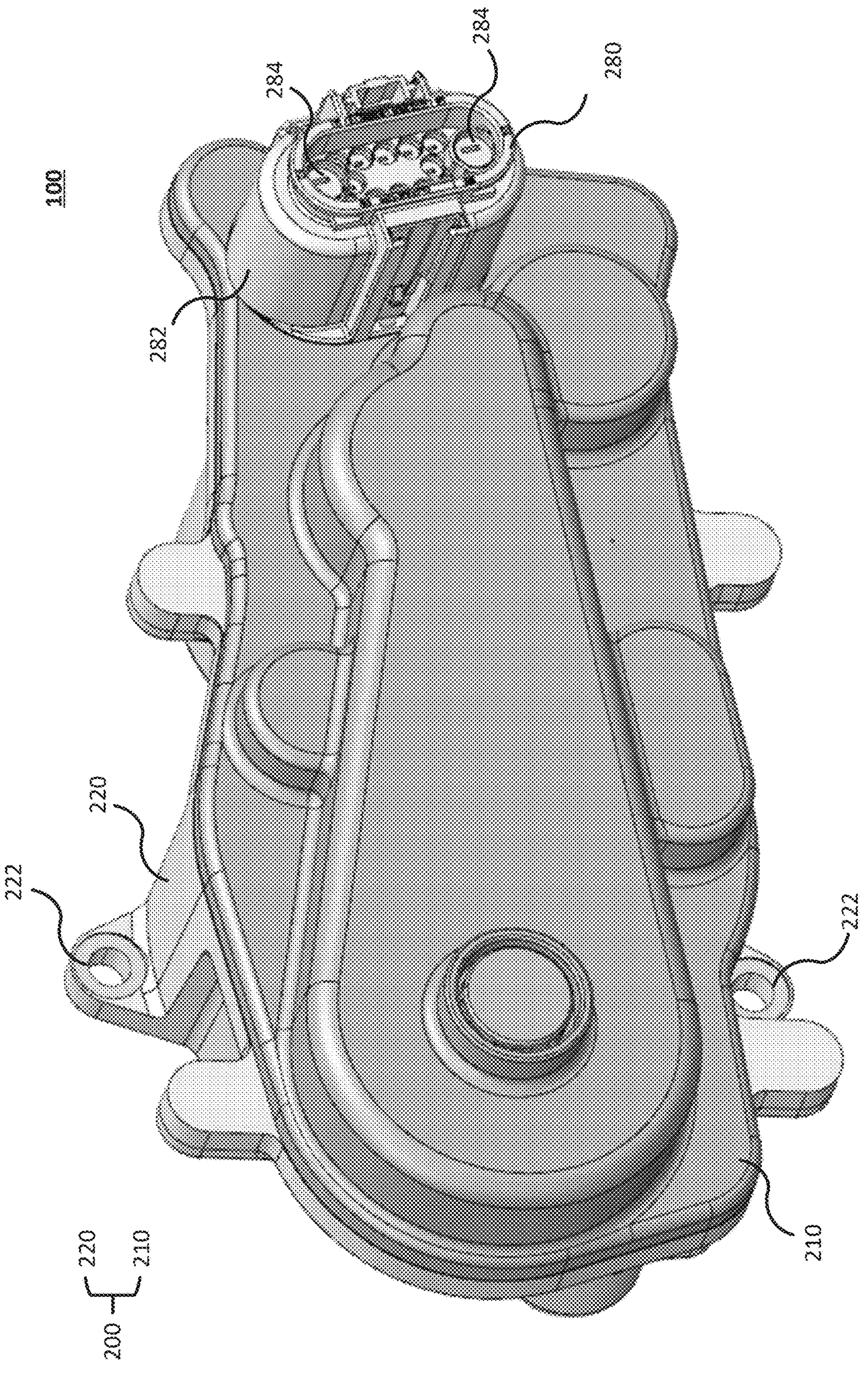
FIG. 2C shows another perspective view of the electromechanical actuator package according to exemplary embodiments of the present disclosure.

FIG. 2A shows a cross-sectional view of an electromechanical actuator package according to exemplary embodiments of the present disclosure. FIG. 2B shows a perspective view of the electromechanical actuator package with a cover removed according to exemplary embodiments of the present disclosure. FIG. 2C shows another perspective view of the electromechanical actuator package according to exemplary embodiments of the present disclosure.

As shown in FIG. 2A, a motor 232 may be fixedly mounted in a housing 200 of the electromechanical actuator package 100. The motor 232 may be disposed in the tubular cavity formed in the housing 200 and be fixed to a lower part of the housing 200. The motor 232 may be an electric motor. The motor 323 may include a motor rotation shaft 234 that extends axially (e.g., from a motor body of the motor 323) toward a circuit board 240 (e.g., a printed circuit board (PCB), or the like). The motor 232 may be electrically connected to the circuit board 240 and/or an electric connector 280 via one or more electrical connections 270 (e.g., electrical conductors, wires, or the like). The electrical connections 270 may connect the motor 232 to appropriate terminals on the circuit board 240 or the electric connector 280.

The motor 232 may be actuated and controlled by the circuit board 240 for providing the desired rotational speed and rotational direction of the motor rotation shaft 234 that protrudes from the motor body of the motor 232. Alternatively, the motor 232 may be electrically connected to an external device via the electric connector 280 and be actuated and/or controlled by the external device, such as a controller (e.g., a chassis controller of a vehicle or the like) disposed outside of the electromechanical actuator package 100 and/or an external power supplier, via the electric connector 280 and be actuated and/or controlled by the external device.

As further shown in FIG. 2A, a drive pulley 230 may be formed on the motor rotation shaft 234 or attached to the motor rotation shaft 234.

More specifically, in some embodiments, the drive pulley 230 may be directly machined on the circumferential surface of the motor rotation shaft 234 to be coupled with a drive belt 252 (i.e., the drive pulley 230 and the motor rotation shaft 232 being a monolithic structure). For example, the drive pulley 230 may be formed on or adjacent to a distal end of the motor rotation shaft 234. Alternatively, in some embodiments, instead of machining the drive pulley 230 on the circumferential surface of the motor rotation shaft 234, the drive pulley 230 may be mounted to and pressed in the motor rotation shaft 234 as a separate piece from the motor rotation shaft 234.

The outer surface of the drive pulley 230 may have any suitable contour or texture to help ensure a gripping contact between the drive belt 252 and the drive pulley 230. For example, the outer surface of the toothed drive pulley 230 and the inner surface of the drive belt 252 can include toothed mating protrusions and/or notches formed therein (not shown). The drive pulley 230 may have alternating teeth and grooves on its outer surface to be meshed with alternating grooves and teeth formed on the inner surface of the drive belt 252.

As further shown in FIG. 2A, the drive pulley 230 of the motor rotation shaft 234 is rotatably engaged with a belt drive mechanism having at least a driven pulley 254 and an actuator output (not shown) housed within an actuator output opening 258. More specifically, the drive pulley 230 of the of the motor rotation shaft 234 and the driven pulley 254 may be rotatably connected to each other via the drive belt 252. Each of the drive pulley 230 and the driven pulley 254 may have an outer surface that engages an inner surface of the drive belt 252. The surfaces of the drive pulley 230 and the driven pulley 254 can have any suitable contour or texture to help ensure a gripping contact between the drive belt 252 and the respective pulleys 230, 254. For example, the surfaces of the drive and driven pulleys 230 and 254, respectively, and the inner surface of the drive belt 252 can include toothed mating protruding and/or notches formed therein.

In embodiments, the drive belt 252 may be fit relatively snugly about the outer circumferences of the drive pulley 230 and the driven pulley 254. Thus, rotational movement of the drive pulley 230 of the motor rotation shaft 234 causes rotation of the driven pulley 254. The diameters of the drive and driven pulleys 230 and 254, respectively, can be any suitable dimension for providing any desired gear ratio, such that the rotational speed of the drive pulley 230 of the motor rotor shaft 234 is different from the rotational speed of the driven pulley 254. For example, the diameter of the driven pulley 254 may be equal to or greater than 7 times the diameter of the drive pulley 230 of the motor rotation shaft 234.

The drive belt 252 may be made from any suitable material or combination of materials flexible enough to loop around the drive and driven pulleys 230 and 254, respectively, and maintain engagement with the outer surfaces of the drive and driven pulleys 230 and 254, respectively, during rotation thereof. The drive belt 252 may be a vee belt or a cog belt, or may be made of individual links forming a chain. Alternatively, the drive belt 252 may be made of an elastomeric material, and may include internal metallic reinforcing members.

In embodiments, the actuator output may be actuated through an actuation (e.g., rotation) of the driven pulley 254 (e.g., by the drive pulley 230 using drive belt 252). As a result, the belt drive mechanism drive mechanism may be configured to multiply torque from the motor 232 to supply braking force to the brake caliper 110, to which the actuator output is connected.

The actuator output within the actuator output opening 258 may have various shapes that can be coupled to a part of the brake assembly (namely, the ball screw mechanism of the brake caliper 110). For example, the actuator output may be formed as a toothed, threaded or splined shaft that can receive the part of the brake assembly. Alternatively, the actuator output may be formed as a toothed, threaded or splined bore that can receive (e.g., be attached to) the part of the brake assembly. Both the shaft and the bore shape of the actuator output may be formed to prevent or minimize rotational lash. Once attached to the ball screw mechanism of the brake caliper 110, the actuator output within the actuator output opening 258 of the electromechanical actuator package 100 may actuate the ball screw mechanism of the brake caliper 110 to generate axial force for actuating a brake pad and brake rotor assembly (or the like) of the brake caliper 110 to generate braking force for a vehicle.

As shown in FIG. 2B, the belt drive mechanism may further comprise an idler 260 (e.g., an eccentric idler, or the like). The idler 260 may be used to engage the drive belt 252 to provide tension in the drive belt 252. The idler 260 may be disposed adjacent to the drive belt 252 and configured to adjust the tension of the drive belt 252. The idler 260 can be operatively in contact with the drive belt 252. The idler 260 may contact the drive belt 252 at a location between the driven pulley 254 and the drive pulley 230. The idler 260 may be, for example, but not limited to, an eccentrically mounted, circular idler pulley. The idler 260 can rotate about a shaft 262 which is eccentrically offset from the center of the idler 260.

Although the configuration of FIG. 2A shows the actuator output (disposed and/or housed within actuator output opening 258) as being a separate component from the driven pulley 254, embodiments disclosed herein are not limited to such a configuration. For example, in some embodiments and similar to how the drive pulley 230 may be formed on the motor shaft 234, the actuator output may be formed as part of the driven pulley 254 (e.g., as a protrusion on a body of the driven pulley 254) at a distal end 256 of the driven pulley 254 or attached on to the distal end 256 of the driven pulley 254. In such a configuration, the actuator output opening 258 of the electromechanical actuator package 100 may be formed directly under the driven pulley 254 such that the actuator output formed on the driven pulley 254 may be accessible to the part of the brake assembly that needs to be actuated by the actuator output.

Additionally, although the configuration of FIG. 2A shows a two-stage belt drive mechanism where the driven pulley 254 actuates another component (e.g., the actuator output, or a component to which the actuator output is connected) disposed within the actuator output opening 258, embodiments disclosed herein are not limited to such a configuration. For example, in some embodiments, the belt drive mechanism may be a single-stage belt drive mechanism where the actuator output is directly formed or attached onto the driven pulley 254.

Even further, although the configuration of FIG. 2A shows a belt drive mechanism that utilizes drive belt 252, embodiments disclosed herein are not limited to such a configuration. For example, instead of a drive belt 252, the driven pulley 254 and the drive pulley 230 may be connected via one or more gears or cogs (e.g., in a gear/cog drive configuration where the two pulleys may also be replaced by gears and/or cogs that are connected and/or mounted on shafts similar to the idler 260). Said another way, instead of using the drive belt 252 to actuate the driven pulley 254, the drive pulley 230 may actuate driven pulley 254 through actuation of one or more gears or cogs that connect the drive pulley 230 to the driven pulley 254.

As further shown in FIG. 2A, the circuit board 240 may be mounted inside of the housing 200. In embodiments, the circuit board may be fully contained within the housing 200.

Turning first top the housing 200, as shown in FIGS. 2A-2C, the housing 200 may comprise a housing body 220 and a cover 210. The housing body 220 may enclose at least a portion of the motor 323, at least a portion of the circuit board 240 and/or at least a portion of the belt drive mechanism (and/or the gear/cog drive mechanism).

As shown in FIGS. 2A and 2B, the housing body 220 may comprise a vertical/tubular housing portion 205 and a planar housing portion 203. The vertical/tubular housing portion 205 and the planar housing portion 203 may be formed as a single piece or may be formed as multiple pieces coupled together. The vertical/tubular housing portion 205 may define a motor cavity receiving at least a portion of the motor 232. The vertical/tubular housing portion 205 may extend (e.g., protrude) from the planar housing portion 203 in a direction perpendicular to a plane of the planar housing portion 203. The vertical/tubular housing portion 205 may have a cylindrical hollow shape, although it is not required. The planar housing portion 203 may define a cavity receiving at least a portion of the belt drive mechanism.

Additionally, the planar housing portion 203 may define a cavity that receives all or a portion of the circuit board 240

(e.g., a cavity in which an entirety of or a portion of the circuit board 240 may be disposed and/or installed). For example, as shown in FIGS. 2A and 2B, the circuit board 240 may be installed (e.g., using securement means, such as screws, snaps, clips or the like) onto a portion of the planar housing portion 203 of the housing body 220.

Turning back to the circuit board 240, as shown in FIGS. 2A and 2B, the circuit board 240 may be mounted onto a portion of housing body 220 such that part or all of the circuit board 240 extends above a top-most surface of the planar housing portion 203 of the housing body 220. Alternatively, no part of the circuit board 240 may extend past the top-most surface of the planar housing portion 203 of the housing body 220.

As further shown in FIGS. 2A and 2B, the circuit board 240 may be installed at one end of the motor rotation shaft 234, for example, but not limited to, toward a distal end of the motor rotation shaft 234 or the drive pulley 230 of the motor rotation shaft 234. For example, the circuit board 240 may be disposed in the uppermost portion of the planar housing portion 203 of the housing body 220. The circuit board 240 may be arranged generally perpendicular to the axis of the motor rotation shaft 234, although it is not required.

As further shown in FIG. 2B, the circuit board 240 may include an opening (e.g., hole) through which the motor rotation shaft 234 is inserted. This opening on the circuit board 240 may surround part of all of the motor rotation shaft 234 or the drive pulley 230 of the motor rotation shaft 234. However, embodiments disclosed herein are not limited to such a configuration. For example, the circuit board 240 may not have any openings through which the motor rotation shaft 234 is inserted but instead may have one or more edges that partially surround and/or is within close proximity and adjacent to the motor rotation shaft 234 or the drive pulley 230 of the motor rotation shaft 234. The distance between the circuit board 240 and the motor rotation shaft 234 may be determined based on a distance required for a sensor (e.g., an inductive position sensor, a motor position sensor as discussed in more detail below in reference to FIGS. 2D and 2E, or the like) on the circuit board 240 to sense a rotation of the motor rotation shaft 234 or the drive pulley 230 of the motor rotation shaft 234 (e.g., using magnetically charged elements 243, or the like).

Furthermore, the circuit board 240 may be disposed under the drive belt 252. In particular, as shown in FIGS. 2A and 2B, the drive belt 252 is suspended above a top side 242 of the circuit board 240. In such a configuration, a bottom side 244 of the circuit board 240 faces towards the vertical/tubular housing portion 205 of the housing body 220. Additionally, in such a configuration, no part of the circuit board 240 is attached to the cover 210. Even further, a clearance between the circuit board 240 and the drive belt 252 (or gears in a gear drive mechanism system or the like) may be any size as long as: (i) no part of a top side 242 of the circuit board 240 is in direct contact with the drive belt 252; and (ii) no components on the top side 242 of the circuit board 240 is in direct contact with the drive belt 252. For example, the clearance between the circuit board 240 and the drive belt 252 may be a line-to-line clearance, or the like.

Such a configuration shown in FIGS. 2A and 2B where the circuit board 240 is placed under the drive belt 252 (or under the gears and/or cogs in a gear/cog drive mechanism configuration) advantageously results in a reduction in the overall size (e.g., an axial packaging space) of the housing 200 of the electromechanical actuator package 100 (namely, a reduction in the size of the cover 210). More specifically, using the cross-section in FIG. 2A as reference, the axial packaging space delimited by a top-most surface from the cover 210 to the bottom most surface of the housing body 220 may be reduced by at least 9 mm over conventional electromechanical actuator packages.

Such a configuration shown in FIGS. 2A and 2B where the circuit board 240 is placed under the drive belt 252 (or under the gears and/or cogs in a gear/cog drive mechanism configuration) further advantageously enables the electric connector 280 to be installed and/or formed in an inboard location of the housing body 220 (e.g., a location inside of an outer edge of the planar housing portion 203 of the housing body 220), which further reduces a horizontal profile of the electromechanical actuator package 100. Such reduction advantageously allows the electromechanical actuator package 100 of embodiments disclosed herein to be installed within tighter spaces within vehicles where component installation space is limited.

Such a configuration shown in FIGS. 2A and 2B where the circuit board 240 is placed under the drive belt 252 (or under the gears and/or cogs in a gear/cog drive mechanism configuration) further advantageously easier and more shortened connections (e.g., electrical connections) between the printed circuit board with the motor 323 and/or other electrical components (e.g., electrical components for a parking brake of the like assembly of the electromechanical actuator package 100) disposed within the vertical/tubular housing portion 205 of the housing body 220. For example, as shown in FIG. 2B, the circuit board 240 may include electrical contacts 272 that can be electrically coupled (e.g., through soldering or the like) to electrical connections (e.g., electrical connections 270, motor phase leads, power lines, ground wires, or the like) of the motor 232 and/or a parking brake assembly (not shown) of the electromechanical actuator package 100. In particular, a reduced length and over mold complexity of motor phase and braking break leads to the ECU on the circuit board 240 may be provided by embodiments disclosed herein.

Other advantages and improvements provided by embodiments disclosed herein include: elimination of cradle with molded inserts and interface to separate ECU cover; reduced header design complexity and shortened terminal design for improved signal integrity (e.g., for Ethernet requirements or the like); reduced number of required fasteners, shafts, columns, and/or joints to secure the circuit board 240 to the housing 200; elimination of one or more seal joints and plastic welding or room temperature vulcanizing (RTV) sealing process required in conventional electromechanical actuator package designs; calibration of motor position sense can be directly coupled to rotor shaft instead through a gear drive; or the like.

In embodiments, the circuit board 240 may comprise any suitable circuitry and electronic components, such as microprocessors (e.g., an electrical control unit (ECU) of the electromechanical actuator package 100, or the like), resistors, capacitors, transistors, or the like mounted thereon. The circuit board 240 may be configured to control the motor 232, for example, but not limited to, supply power to the motor 232, activate or deactivate the operation of the motor 232, and vary the speed of the motor 232 and/or the rotational direction of the motor 232. The circuit board 240 may have a first and second opposed sides (e.g., the top side 242 and the bottom side 244). The top side 242 faces the inner surface of the cover 210 and one or more components of the belt drive mechanism (or the gear/cog drive mechanism in a gear/cog drive configuration of the electromechanical actuator package 100) while the bottom side 244 faces the motor 232. The circuitry and electronic components can be mounted on both (or either) of the top side 242 and the bottom side 244.

As shown in FIGS. 2A and 2C, the cover 210 may be affixed to one side of the housing body 220 (e.g. the upper side of the housing body 220). The cover 210 may be secured to the housing body 220 using securement means, such as screws, snaps, clips or the like. The cover 210 enables assembly of or access to the circuit board 240 that is installed within the planar housing portion 203 of the housing body 220. The cover 210 may enclose a portion of the circuit board 240 (e.g., side edges of the circuit board 240) and may also cover a top side 242 of the circuit board 240.

As further shown in FIGS. 2A and 2C, the cover 210 may also have a hole (e.g., opening) through which the electrical connector 280 may be inserted. In embodiments, the cover 210 may be a Snap-On cover that can be snapped onto the housing body 220 without the use of any separate and/or additional fastening means such as nuts, bolts, screws, or the like.

As shown in FIGS. 2A-2C, the housing 200 can have any suitable shape for housing the components of the electromechanical actuator package 100, and may be formed separately or in combination and can have multiple number of parts. The housing 200 may fully enclose the motor 232, the circuit board 240 and the belt drive mechanism as a single package. Furthermore, the example configuration shown in FIG. 2C provides a modular "bolt-on" design for the electromechanical actuator package 100 where the electromechanical actuator package 100 is bolted onto the brake caliper 110 via connector portions 222 through which the bolts may be inserted. Other methods for attaching the electromechanical actuator package 100 to the brake caliper 110 besides the "bolt-on" design may also be utilized without departing from the scope of embodiments disclosed herein.

In embodiments, the housing 200 may have one or more of planar and circular surfaces, openings for shafts and bearings and various recesses, shoulders, flanges, counterbores and the like to receive various components and assemblies of the electromechanical actuator package 100. Numerous different materials may suitably be used for the various components of the housing 200. For example, the housing 200 may be die cast of metal such as aluminum. In another example, the housing 200 may be formed from a polymeric material. Alternatively, the housing 200 may be formed from any other suitable strong and relatively light weight material.

The housing 200 may further comprise the electric connector 280 capable of receiving and connecting with a connecting part 290 (e.g., a plug, a female or male connector, or the like) of an external device for supplying power to the circuit board 240 and/or the motor 232 and/or for electrically communicating with the circuit board 240 and/or the motor 232. The electric connector 280 may comprise a connector housing 282 having a structure for receiving and connecting with the connecting part 290 of the external device. The connector housing 282 may be formed with the housing 200 as one single piece with the housing body 220, for example, but not limited to, by molding. Alternatively, the connector housing 282 may be a separate part from the housing 200 and be secured to the housing 200. One or more electrical conductors 284 may extend from the connector housing 282 to the circuit board 240. A portion of the electrical conductors 284 may be disposed outside of the housing 200 and the connector housing 282 to be contacted with an electrical conductor of the connecting part 290 of the external device. The electric connector 280 may be either a male or female type connector. One end of the electrical conductors 284 of the connector housing 282 may be formed as a connector pin, plug or socket. The other end of the electrical conductors 284 may be connected to the circuit board 240 and/or the motor 232. For example, an electrical energy source, e.g. the vehicle battery, or a vehicle control unit (e.g., a chassis controller or the like) may be connected to the circuit board 240 and/or the motor 232 via the connector pin in the connector housing 282.

Although the circuit board 240 is shown in FIG. 2B as having a specific shape and profile, the shape and profile of the circuit board 240 is not limited to such a configuration. In particular, a person having ordinary skill in the art would appreciate that the circuit board 240 may have any shape and/or profile as long as the circuit board 240 can be situated (e.g., placed, installed, disposed, or the like) under the drive belt 252 and/or the other mechanical components (e.g., the driven pulley 254, the drive pulley 230, the idler 260, or the like) that are placed above the planar housing portion 203 of the electromechanical actuator package 100.

Figure 2D:
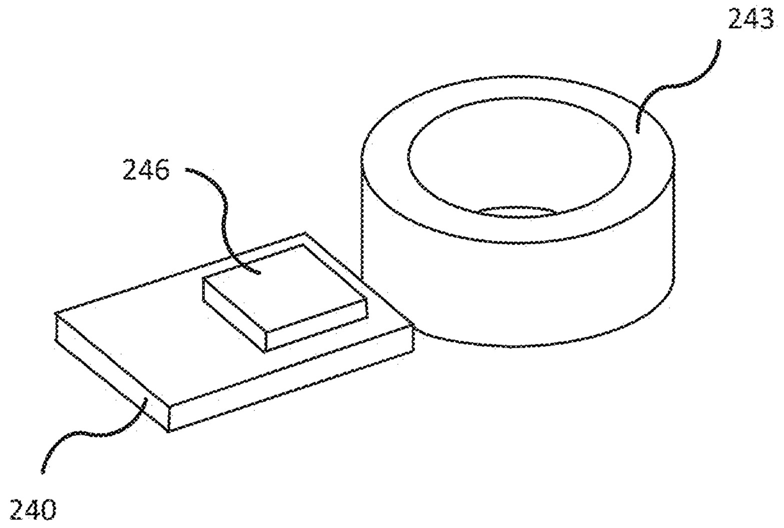
FIGS. 2D and 2E show examples of an off-axis configuration for a motor position sensor of the electromechanical actuator package according to exemplary embodiments of the present disclosure.
Figure 2E:
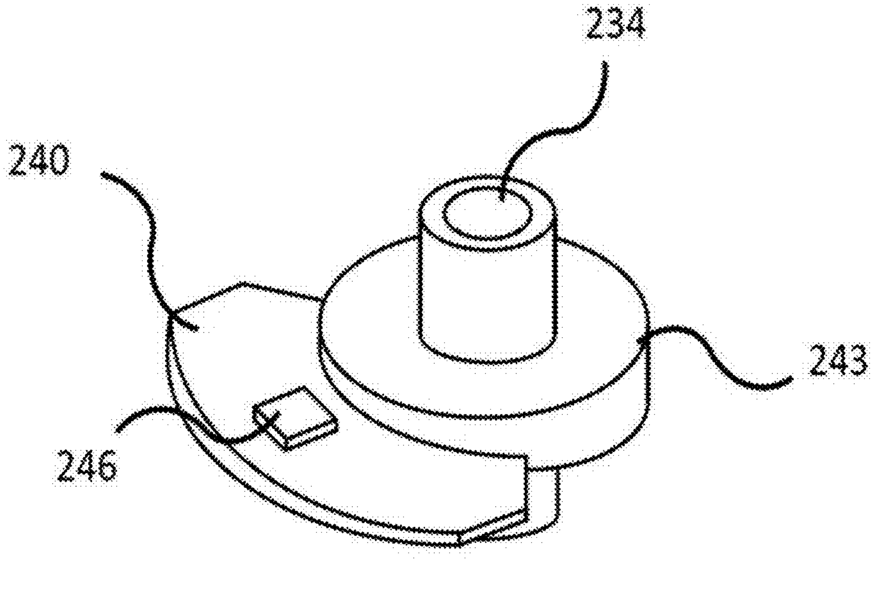

Turning now to FIGS. 2D and 2E, FIGS. 2D and 2E show examples of an off-axis configuration for a magnetic encoder of the electromechanical actuator package according to exemplary embodiments of the present disclosure.

In particular, a motor position sensor 246 (e.g., a magnetic sensor, or the like) may be disposed on the circuit board 240, and is electrically connected with the circuit board 240. For example, the motor position sensor 246 may be directly mounted on the top side 242 of the circuit board 240 facing the distal end of the motor rotation shaft 234 and the cover 210. Because the motor position sensor 246 is supported on the circuit board 240, the motor position sensor 246 can be easily electrically connected to the circuitry of the circuit board 240 without the need of a separate lead frame. The motor position sensor 246 can be directly connected to the circuit board 240, such as by soldering or by any other suitable method.

The motor position sensor 235 may be disposed in sensing relationship with the motor rotation shaft 234. For example, the motor position sensor 235 may be positioned adjacent to a body the motor rotation shaft 234 or the drive pulley 230 of the motor rotation shaft 234.

The motor position sensor 246 is responsive to the rotation of the motor rotation shaft 234 or the drive pulley 230 of the motor rotation shaft 234. For example, the motor position sensor 246 and the motor rotation shaft 234 are configured such that the motor position sensor 246 can detect the rotational speed of the motor rotation shaft 234 and/or the rotational direction of the motor rotation shaft 234 (or the drive pulley 230 of the motor rotation shaft 234). Furthermore, the motor position sensor 246 and the motor rotation shaft 234 may be configured such that the motor position sensor 246 can detect the angular position of the motor rotation shaft 234. The motor position sensor 246 may generate an output signal indicative of the detected status of the motor 232.

The motor position sensor 246 and the motor rotation shaft 234 can be any suitable device(s) for generating signal responsive to the rotation of the motor rotation shaft 234. For example, the motor position sensor 246 can be a non-contact limit switch. The motor position sensor 246 may be a Hall effect sensor. Correspondingly, the motor rotation shaft 234 may include a magnetic gradient 243 formed around a circumference of the motor rotation shaft 234 defined by a plurality of alternating north and south magnetically charged elements circumferentially spaced about the circumference of the motor rotation shaft 234. The magnetically charged elements 243 of the motor rotation shaft 234 can be any suitable component or material capable of retaining a magnetic charge. The magnetically charged elements 243 of the motor rotation shaft 234 can be formed and/or mounted on the circumference of the motor rotation shaft 234 and/or be held onto the circumference of the motor rotation shaft 234 using a separate component such as a belt flange or the like. For example, the magnetically charged elements 243 may be disposed (e.g., held) within a belt flange that is installed (e.g., attached) onto the outer circumference of the motor rotation shaft 234.

Although the electromechanical actuator package 100 are described as having the motor position sensor 246 and magnetically charged elements 243 as shown in FIGS. 2B and 2D-2E, embodiments disclosed herein are not limited to this configuration. In particular, the electromechanical actuator package 100 may include, instead of the motor position sensor 246 and magnetically charged elements 243, an eddy-current based inductive position sensor (or the like) for sensing a position (e.g., motor angle) of the motor 232 without departing from the scope of embodiments disclosed herein. Such an eddy-current based inductive position sensor may be configured to be part of the circuit board 240, or may be configured as a separate PCB from the circuit board 240.

Figure 3:
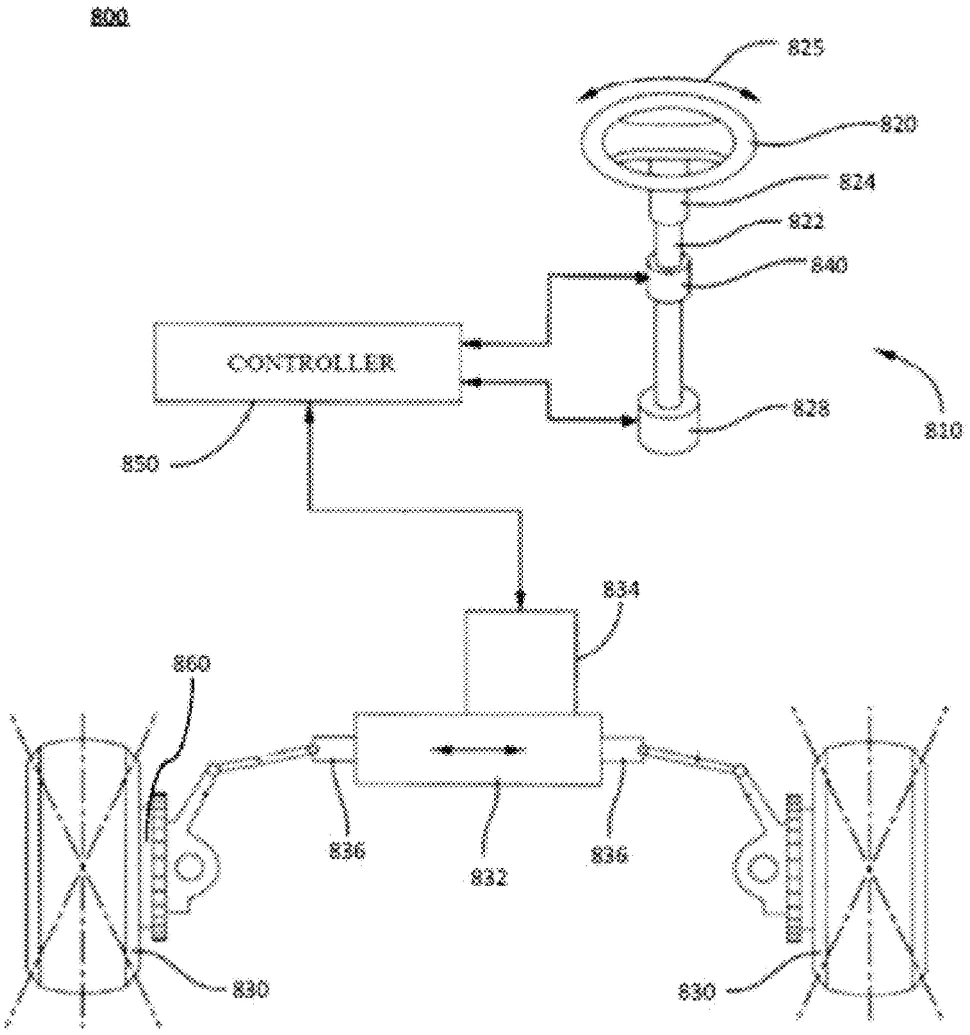
FIG. 3 shows a schematic view of a vehicle including a steering system and a brake assembly according to one or more exemplary embodiments of the present disclosure.

Any vehicle according to certain exemplary embodiments of the present disclosure may be identical, or substantially similar to, vehicle 800 shown in FIG. 3. The vehicle 800 may be any passenger or commercial automobile such as a hybrid vehicle, an electric vehicle, or any other type vehicles. FIG. 3 is a schematic view of a vehicle 800 including a steering system and a brake assembly 860 (e.g., a combination of the brake caliper 110 and the electromechanical actuator package 100 as discussed above in reference to FIG. 1A) according to an exemplary embodiment of the present disclosure. The vehicle 800 may include a steering system 810 for use in a vehicle. The steering system 810 can allow a driver or operator of the vehicle 800 to control the direction of the vehicle 800 or road wheels 830 of the vehicle 800 through the manipulation of a steering wheel 820. The steering wheel 820 is operatively coupled to a steering shaft (or steering column) 822. The steering wheel 820 may be directly or indirectly connected with the steering shaft 822. For example, the steering wheel 820 may be connected to the steering shaft 822 through a gear, a shaft, a belt and/or any connection means. The steering shaft 822 may be installed in a housing 824 such that the steering shaft 822 is rotatable within the housing 824.

The road wheels 830 may be connected to knuckles, which are in turn connected to tie rods. The tie rods are connected to a steering assembly 832. The steering assembly 832 may include a steering actuator motor 834 and steering rods 836. The steering rods 836 may be operatively coupled to the steering actuator motor 834 such that the steering actuator motor 834 is adapted to move the steering rods 836. The movement of the steering rods 836 controls the direction of the road wheels 830 through the knuckles and tie rods.

One or more sensors 840 may be configured to detect position, angular displacement or travel 825 of the steering shaft 822 or steering wheel 820, as well as detecting the torque of the angular displacement. The sensors 840 provide electric signals to a controller 850 indicative of the angular displacement and torque 825. The controller 850 sends and/or receives signals to/from the steering actuator motor 834 to actuate the steering actuator motor 834 in response to the angular displacement 825 of the steering wheel 820.

In the steer-by-wire steering system, the steering wheel 820 may be mechanically isolated from the road wheels 830. For example, the steer-by-wire system has no mechanical link connecting the steering wheel 825 from the road wheels 830. Accordingly, the steer-by wire steering system may comprise a feedback actuator or steering feel actuator 828 comprising an electric motor which is connected to the steering shaft or steering column 822. The feedback actuator or steering feel actuator 828 provides the driver or operator with the same "road feel" that the driver receives with a direct mechanical link.

Although the embodiment illustrated in FIG. 3 shows the vehicle 800 having the steer-by-wire steering system, the vehicle 800 may alternatively have a mechanical steering system without departing from embodiments disclosed herein. The mechanical steering system typically includes a mechanical linkage or a mechanical connection between the steering wheel 820 and the road wheels 830. In the mechanical steering system, the steering actuator motor 834 includes an electric motor to provide power to assist the movement of the road wheels 830 in response to the operation of the driver or a control signal of the controller 850. Accordingly, the electric motor can be used as the steering actuator motor 834 or can be included in the feedback actuator or steering feel actuator 828.

Although the example embodiments have been described in detail, it should be understood that various changes, substitutions and alterations can be made herein without departing from the spirit and scope of the present disclosure as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An electromechanical actuator package, comprising:
- a motor comprising a motor body and a motor rotation shaft protruding from the motor body;
- a belt drive mechanism connecting the motor rotation shaft to an actuator output via a drive belt;
- a circuit board; and
- a housing enclosing the motor, the belt drive mechanism, and the circuit board, wherein the circuit board is positioned between the drive belt and the motor body.

2. The electromechanical actuator package of claim 1, wherein
- the housing comprises a housing body and a cover, and
- a top side of the circuit board faces the drive belt and the cover.

3. The electromechanical actuator package of claim 2, wherein the drive belt is positioned between the cover and the circuit board.

4. The electromechanical actuator package of claim 3, wherein the circuit board is installed on the housing body.

5. The electromechanical actuator package of claim 4, wherein
- the housing body comprises a tubular housing portion in which the motor is positioned and a planar housing portion in which the circuit board is positioned, and
- the cover being attached onto the planar housing portion of the housing body.

6. The electromechanical actuator package of claim 5, wherein the housing body is attached to a brake caliper.

7. The electromechanical actuator package of claim 2, wherein, within the housing, the circuit board is positioned closer to the motor body than the drive belt.

8. The electromechanical actuator package of claim 2, wherein no part of the circuit board is in contact with the cover.

9. The electromechanical actuator package of claim 8, wherein the cover is a Snap-On cover.

10. The electromechanical actuator package of claim 1, wherein a portion of the motor rotation shaft extends past a first surface of the circuit board, and the first surface of the circuit board faces the drive belt while a second surface of the circuit board faces the motor body from which the motor rotation shaft protrudes.

11. The electromechanical actuator package of claim 10, wherein the portion of the motor rotation shaft extends past the first surface of the circuit board through an opening formed on a body of the circuit board.

12. The electromechanical actuator package of claim 11, wherein the circuit board comprises a motor position sensor configured to sense an angular position of the motor rotation shaft in an off-axis configuration manner.

13. The electromechanical actuator package of claim 12, wherein magnetically charged elements are attached to an outer circumference of the motor rotation shaft at a position where the motor rotation shaft extends through the opening formed on the body of the circuit board.

14. The electromechanical actuator package of claim 13, wherein the magnetically charged elements are held within a belt flange that is attached to the outer circumference of the motor rotation shaft.

15. The electromechanical actuator package of claim 1, wherein the drive belt comprises a first surface and a second surface, the first surface being wider than the second surface and engages with the motor rotation shaft, and the circuit board faces the second surface of the drive belt.

16. The electromechanical actuator package of claim 15, wherein the first surface of the drive belt surrounds a portion of the motor rotation shaft.

17. The electromechanical actuator package of claim 1, wherein the drive belt is attached to a first portion of the motor rotation shaft, the circuit board is positioned adjacent to a second portion of the motor rotation shaft, and the first portion of the motor rotation shaft is closer to a distal end of the motor rotation shaft than the second portion of the motor rotation shaft.

18. The electromechanical actuator package of claim 17, wherein the second portion of the motor rotation shaft is closer to a body of the motor from which the motor rotation shaft extends.

19. The electromechanical actuator package of claim 18, wherein
- the housing comprises a housing body and a cover,
- the motor rotation shaft extends toward the cover, and
- a first side of the circuit board faces the cover and the drive belt while a second side of the circuit board faces the body of the motor.

20. An electromechanical actuator package, comprising:
- a motor comprising a motor body and a motor rotation shaft protruding from the motor body;
- a gear drive mechanism connecting the motor rotation shaft to an actuator output via one or more gears;
- a circuit board; and
- a housing enclosing the motor, the gear drive mechanism, and the circuit board, wherein the circuit board is positioned between the one or more gears and the motor body.

* * * * *